United States Patent
Leglize

(10) Patent No.: US 9,969,233 B2
(45) Date of Patent: May 15, 2018

(54) MECHANICAL ACTUATOR WITH A HYDRAULIC DAMPER DEVICE

(71) Applicant: MESSIER-BUGATTI-DOWTY, Velizy-Villacoublay (FR)

(72) Inventor: Ludovic Leglize, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 477 days.

(21) Appl. No.: 14/075,642

(22) Filed: Nov. 8, 2013

(65) Prior Publication Data

US 2014/0137680 A1    May 22, 2014

(30) Foreign Application Priority Data

Nov. 22, 2012    (FR) ...................................... 12 03139

(51) Int. Cl.
*B60G 15/12*    (2006.01)
*B64C 25/22*    (2006.01)
(Continued)

(52) U.S. Cl.
CPC .............. *B60G 15/12* (2013.01); *B64C 25/18* (2013.01); *B64C 25/22* (2013.01); *F16H 25/20* (2013.01); *Y10T 74/18648* (2015.01)

(58) Field of Classification Search
CPC ......... B64C 25/18; B64C 25/22; B64C 25/26; B64C 25/30; B64C 25/12;
(Continued)

(56) References Cited

U.S. PATENT DOCUMENTS 2,679,827 A * 6/1954 Perdue ................... F01B 17/00
    188/317
3,023,631 A * 3/1962 Curtis .................... B23Q 5/402
    188/31
(Continued)

FOREIGN PATENT DOCUMENTS

EP        0904680 A1 *  3/1999    ......... A01B 59/0415
FR     2 616 712 A1    12/1988
(Continued)

*Primary Examiner* — Victor L MacArthur
*Assistant Examiner* — Bobby Rushing, Jr.
(74) *Attorney, Agent, or Firm* — Sughrue Mion, PLLC

(57) ABSTRACT

The invention relates to an actuator comprising a cylinder (1) in which a rod (2) is mounted to slide, the actuator having a screw (8) extending inside the rod to co-operate with a nut (7) secured to the rod, the screw being driven in rotation by a motor (10), the actuator being characterized in that a hydraulic chamber (CH) filled with hydraulic fluid is arranged inside the actuator by means of a floating piston (20) sliding in sealed manner against the rod inside of the actuator, the hydraulic chamber being in fluid flow communication with an accumulator (21) via a solenoid valve (22) that is controllable between a closed state in which the chamber is isolated from the accumulator, and a fluid-passing state in which the hydraulic chamber and the accumulator are in communication, calibrated resistance being exerted against the passage of fluid from the chamber towards the accumulator.

10 Claims, 2 Drawing Sheets

(51) Int. Cl.
*F16H 25/20* (2006.01)
*B64C 25/18* (2006.01)

(58) Field of Classification Search
CPC ... B64C 2025/125; B64C 25/14; B64C 25/20; F16H 25/20; F16H 25/205; F16H 2025/2059; B60G 15/12; F15B 1/021; F15B 1/024
USPC ............ 74/89.23, 89.25, 89.35, 89.39, 127, 74/424.71, 424.78; 92/69 A, 110, 129, 92/143; 137/487.5, 488, 552.7
See application file for complete search history.

(56) References Cited

U.S. PATENT DOCUMENTS

| | | | | |
|---|---|---|---|---|
| 4,481,864 A | * | 11/1984 | Peruzzi | B66F 3/30 188/82.2 |
| 4,579,209 A | * | 4/1986 | Pacht | B60W 30/18 477/166 |
| 4,585,096 A | | 4/1986 | Bok | |
| 4,858,898 A | * | 8/1989 | Niikura | B60G 15/12 267/218 |
| 4,915,324 A | * | 4/1990 | Foreau | B64C 25/66 244/100 R |
| 4,944,370 A | | 7/1990 | Chambers et al. | |
| 5,310,140 A | * | 5/1994 | Veaux | B64C 25/001 244/104 FP |
| 5,619,413 A | * | 4/1997 | Oakley | B60G 17/017 280/5.514 |
| 5,908,174 A | * | 6/1999 | Churchill | B64C 25/18 244/102 SS |
| 6,308,916 B1 | * | 10/2001 | Hrusch | B64C 25/22 244/102 R |
| 6,928,894 B2 | * | 8/2005 | Falcou | F15B 15/088 160/188 |
| 7,313,978 B2 | * | 1/2008 | Cavagna | F16H 25/2025 74/424.78 |
| 8,556,209 B2 | * | 10/2013 | Luce | B64C 25/14 244/102 SS |
| 8,573,080 B2 | * | 11/2013 | Quenerch'du | B64C 13/28 74/89.23 |
| 8,684,306 B2 | * | 4/2014 | Martin | B64C 25/26 244/102 SL |
| 8,827,205 B2 | * | 9/2014 | Mason | B64C 25/18 244/102 R |
| 2007/0278028 A1 | * | 12/2007 | Fought | B60G 15/12 180/282 |
| 2013/0299631 A1 | * | 11/2013 | Tucker | B64C 25/26 244/102 R |

FOREIGN PATENT DOCUMENTS

| | | | | |
|---|---|---|---|---|
| FR | 2894303 A1 | * | 6/2007 | ......... A01M 7/0053 |
| NL | 1000788 C2 | * | 1/1997 | ............ F02B 71/045 |

* cited by examiner

MECHANICAL ACTUATOR WITH A HYDRAULIC DAMPER DEVICE

The invention relates to a mechanical actuator having a controlled damper device.

The present invention relates to an electromechanically operated actuator with hydraulic damping that is particularly advantageous for operating the landing gear of an aircraft between a deployed position and a retracted position.

BACKGROUND OF THE INVENTION

Telescopic type hydraulic actuators are known that comprise a cylinder defining a spherical cavity and a rod that extends through one end of the cavity, being secured to a piston that is mounted to slide axially inside the cavity so as to define two hydraulic chambers therein. During a movement of the rod, it is known to organize throttling on the outlet from the chamber from which fluid is expelled in order to perform hydraulic damping. Such throttling generates resistance that is proportional to the square of the travel speed of the rod.

Electrohydraulic actuators are also known that have an electric pump arranged to move fluid from one chamber to the other of the actuator. It is also possible to organize damping by throttling the fluid that is expelled from one of the chambers during movement of the rod. Nevertheless, such an actuator is not suitable for emergency operation in which the rod is driven by the load to which it is coupled, unless the pump is reversible and is capable of being released.

Mechanical actuators are also known that comprise a screw extending inside the rod for co-operating with a nut secured to the rod, the screw being driven in rotation by a motor, which on being activated causes the rod to move axially. In such actuators, damping may be provided by organizing resistance, e.g. of the friction type or of the electromagnetic type, against movement of the rod. Nevertheless, the first type of resistance is essentially independent of the travel speed of the rod, while the second type of resistance is rather difficult to organize and in general is a function of the travel speed of the rod, and that might be found to be insufficient in certain applications. In addition, such damping leads to numerous problems in service, such as wear or lack of reliability.

Finally, document FR 2 946 618 is known, which discloses a hydraulically-damped electromechanical actuator having a cylinder in which a rod is mounted to slide, the actuator having a screw that extends inside the rod to co-operate with a nut secured to the rod, the screw being driven in rotation by a motor. The rod is associated with a piston that slides inside a cavity of the cylinder in order to define two chambers therein, the chambers being filled with hydraulic fluid and being put into communication by transfer means fitted with at least one regulator member adapted to throttling the fluid expelled from one of the chambers, for at least one travel direction of the rod.

In that type of actuator, both chambers are permanently filled with hydraulic fluid, and in general they need to be connected to an accumulator in order to deliver or receive differential flow rates between the two chambers. Fluid transfer, and thus hydraulic damping, then accompanies each of the movements of the rod, whereas in normal operation such damping is not always necessary.

OBJECT OF THE INVENTION

The invention seeks to propose a mechanically actuated actuator presenting damping in the rod return direction that may be implemented on demand.

BRIEF SUMMARY OF THE INVENTION

In order to achieve this object, the invention provides an actuator comprising a cylinder in which a rod is mounted to slide, the actuator having a screw extending inside the rod to co-operate with a nut secured to the rod, the screw being driven in rotation by a motor, and wherein, according to the invention, a hydraulic chamber filled with hydraulic fluid is arranged inside the actuator by means of a floating piston sliding in sealed manner against the rod inside of the actuator, the hydraulic chamber being in fluid flow communication with an accumulator via a solenoid valve that is controllable between a closed state in which the chamber is isolated from the accumulator, and a fluid-passing state in which the hydraulic chamber and the accumulator are in communication, calibrated resistance being exerted against the passage of fluid from the chamber towards the accumulator as obtained when movement of the rod inside the actuator leads to a reduction in the volume of the hydraulic chamber.

To understand the invention, the term "floating piston" designates the fact that the piston is not mechanically held relative to a part that is external to the piston. Consequently, the floating piston is suitable for sliding on its own and in sealed manner against and along the rod, without being pushed or pulled for moving axially relative to the rod by another part mechanically linked to the piston. This movement of the floating piston independently of the axial movement of any other part mechanically linked to the piston is made possible merely by varying the pressure inside the hydraulic chamber with the help of the solenoid valve putting the hydraulic chamber and the accumulator selectively into fluid flow communication. Thus, it is possible for the floating piston to move merely by applying a pressure difference between the opposite faces of the piston and without any need to cause the piston to co-operate mechanically with any other part external to the piston, such as a piston rod. It is thus possible optionally to engage the damping function by moving the piston hydraulically, without that requiring the use of a mechanical part fastened to the piston in order to move it.

The operation of the actuator of the invention is as follows. During normal mechanical operation without damping, the hydraulic chamber is preferably maintained at a minimum volume, the fluid being held captive in the accumulator by the solenoid valve. If it is desired to perform hydraulic damping, it suffices to control the solenoid valve so as to put it in its fluid-passing state. The hydraulic fluid is then transferred from the accumulator to the hydraulic chamber, thereby causing the floating piston to move until it comes into abutment against an internal abutment of the actuator. During this movement, the floating piston slides in sealed manner along the rod, either against the inside wall of the rod or else against the outside wall of the rod, thereby varying the volume of the hydraulic chamber. Since the piston is floating, at least in certain positions of the rod relative to the cylinder, it is capable of sliding independently of the movement of the rod relative to the cylinder of the actuator. A movement of the rod tending to reduce the volume of the hydraulic chamber can then only be achieved against the resistance exerted by the solenoid valve as the fluid passes from the hydraulic chamber of volume that is reducing towards the accumulator.

This mode of operation of the actuator may be used when the load coupled to the actuator (e.g. aircraft landing gear) causes the rod to move under drive from the load, e.g. under the effect of gravity. The damping as organized in this way serves to regulate the travel speed of the load. The motor of the actuator is then not used for controlling said speed, thereby sparing the motor. This naturally assumes that the connection between the nut and the screw is reversible.

In a particular aspect of the invention, the actuator is provided with controllable separation means for separating the nuts and the rod.

Thus, e.g. in the event of a failure of the motor causing the screw to block, it is possible to separate the rod from the nut, and thus allow the rod to slide freely under the effect of the load. Before being separated, care should naturally be taken to operate the solenoid valve to activate hydraulic damping as described above so that the travel speed of the load can be controlled while the rod is returning under the action of the load.

Naturally, when the load reaches the end of its stroke, the rod is close to its extreme position (either fully returned or else fully extended), and the hydraulic chamber presents a minimum volume. It is in this situation that the solenoid valve is controlled to take up the closed state, thus holding the major portion of the fluid captive in the accumulator.

It should be observed that in the actuator of the invention, the fluid is used only for damping or braking movements of the rod, and not for driving said movements, unlike actuators having an incorporated pump, or double-acting actuators such as that of document FR 2 859 770. Thus, advantage is taken of hydraulic damping only when it is necessary. It should also be observed that the actuator is not filled with oil like the actuator described in document FR 2 946 618, thereby leading to significant lightening.

Finally, such a damper device can be installed a posteriori on an already-existing actuator, providing it is possible to install a floating piston that slides in sealed manner inside the actuator. It then suffices to provide an outlet port on the actuator in order to provide a fluid flow connection between the hydraulic chamber as created in this way and an accumulator, via the solenoid valve. Alternatively, the damper device may be removed from the actuator, if damping is not useful.

According to a particularly advantageous aspect of the invention, a method is provided of monitoring an actuator of the invention, the method consisting in leaving the rod to move freely solely under the action of a load coupled to the rod, and in verifying at least one operating parameter of the landing gear associated with the hydraulic damping. In particular, the length of time taken by the rod to move under the effect of the load against the hydraulic damping as organized in this way is verified, thereby making it possible to verify proper operation thereof.

BRIEF DESCRIPTION OF THE DRAWINGS

The invention can be better understood in the light of the following description with reference to the accompanying drawings, in which.

DETAILED DESCRIPTION OF THE INVENTION

Figure 1:
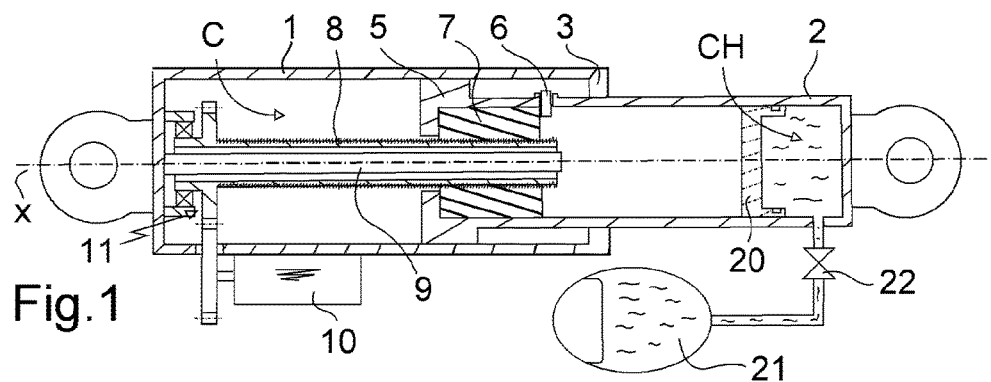
FIG. 1 is a longitudinal section view of an actuator in a first embodiment of the invention, while operating without hydraulic damping.

With reference to FIG. 1, the actuator of the invention comprises a cylinder 1 defining a cylindrical cavity C extending along a longitudinal axis X. The actuator has a hollow rod 2 that extends axially inside the cavity C in order to pass through an end wall 3 forming a bearing that closes the cavity C at one of its ends. The rod 2 is terminated inside of the cavity C by an open end forming a bearing 5 slidable in the cavity C.

Internally, the bearing 5 defines a housing that receives a nut 7 mounted in said housing, such that the rod 2 and the nut 7 are held together by a locking device 6 (a finger in this example). A command tending to counteract the locking device serves to separate the rod 2 from the nut 7 so that the rod 2 can slide freely, independently of the nut 7.

A screw 8 mounted to rotate in the cylinder 1 extends axially in the rod 2 to co-operate with the nut 7 by means of a helical type connection.

In this example, the screw 8 is driven in rotation by means of an electric motor 10 via gearing 11, such that when the rod 2 is secured to the nut 7, rotation of the screw 8 driven by the motor 10 causes the rod 2 to move axially. To this end, anti-rotation means (not shown) prevent the rod 2 from rotating relative to the cylinder 1. The anti-rotation means may be internal to the actuator; however they may also be external to the actuator, as in the situation where the rod and the cylinder of the actuator are coupled to loads by means of linkages that prevent relative rotation of the rod and the cylinder.

A floating piston 20 is slidably mounted with sealing in the end of the rod 2. In this embodiment, the piston 20 slides in sealed manner against a longitudinal internal annular wall of the rod. Together with the closed end of the rod 2, the floating piston 20 defines a hydraulic chamber CH of variable volume that is filled with hydraulic fluid and that is put into fluid flow communication with an accumulator 21 via a solenoid valve 22 presenting two controllable states:

a blocking state in which the hydraulic chamber CH is isolated from the accumulator 21; and a fluid-passing state in which the fluid is free to flow between the accumulator 21 and the hydraulic chamber CH, the solenoid valve 22 opposing calibrated resistance to the passage of the fluid from the hydraulic chamber CH towards the accumulator 21.

In the situation shown in FIG. 1, the actuator is in a normal mode of operation, the locking mechanism 6 securing the nut 7 to the rod 2, with the solenoid valve 22 being in the blocking state. It should also be observed that the chamber CH presents a minimum volume. In this situation, the rod 2 may be controlled to be extended or to be a returned by causing the motor 10 to rotate, or by using the driving effect of the load, and without any hydraulic damping appearing.

Figure 2:
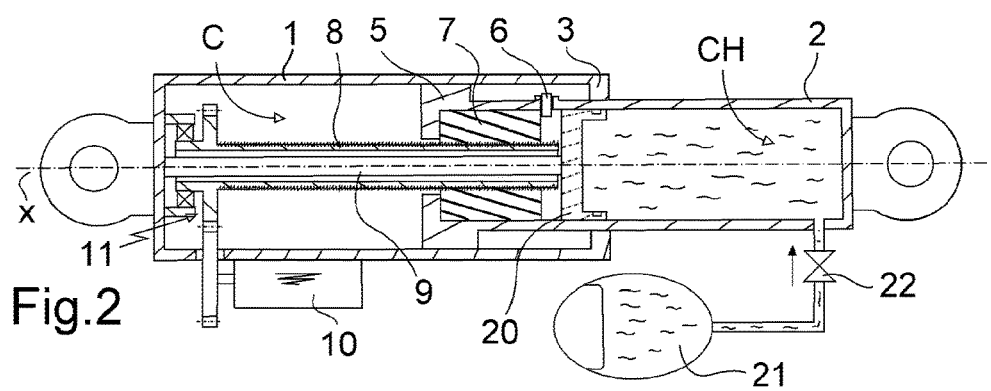
FIG. 2 is a view similar to view of FIG. 1, showing the operation of the actuator with hydraulic damping activated.

If it is desired to be able to benefit from damping while returning the rod, then the first step is to operate the solenoid valve 22 so that it allows hydraulic fluid to pass between the accumulator and the hydraulic chamber CH. Under the pressure that exists inside the accumulator, the fluid will begin by being expelled therefrom and will push back the floating piston 20 until it comes into abutment against the end of an abutment 9 (which in this example extends inside the screw 8 in order to project therefrom), as shown in FIG. 2.

In this situation, it is possible to cause the rod to be returned with help from the motor. If the load coupled to the rod 2 naturally pushes it so that it returns (e.g. under the effect of gravity), it is also possible to allow the rod to return under the action of the load. In so doing, the volume of the hydraulic chamber will reduce, and fluid will be expelled therefrom towards the accumulator. However, the solenoid valve 22 exerts resistance to the passage of the fluid, thereby generating hydraulic damping that makes it possible to regulate the speed at which the rod 2 moves, and thus the speed at which the load moves, without any need of help from the motor. It should be observed that the accumulator then reinflates naturally, such that it is once more ready for another damping sequence. It should also be observed that when the solenoid valve 22 is in the fluid-passing state, the pressure that exists inside the accumulator is communicated to the hydraulic chamber. This pressure gives rise to a force that opposes the movement of the rod, thereby also contributing to regulating the speed at which the rod moves.

Figure 4:
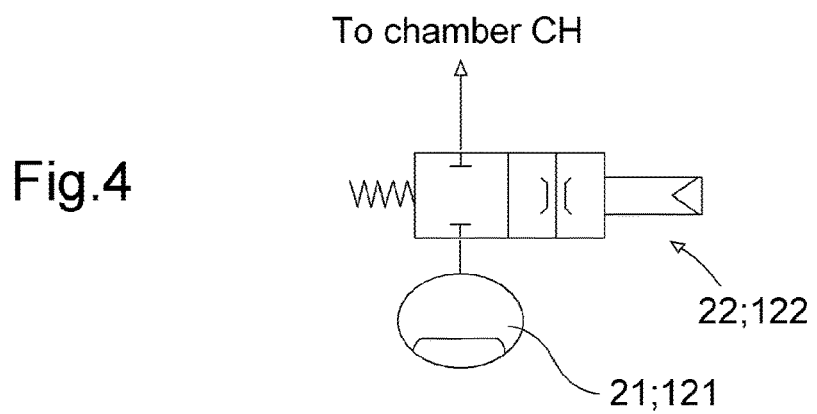
FIG. 4 is a hydraulic circuit diagram showing the operation of the solenoid valve forming part of the actuator of FIGS. 1 to 3.

FIG. 4 is a hydraulic circuit diagram of a solenoid valve suitable for use with the actuator of the invention.

In the event of the screw 8 being blocked (e.g. because of a failure of the electric motor 10), it is possible to control the locking device 6 to release the nut 7 from the rod 2. The rod is then free to move under drive from the load, while the nut remains blocked in axial position. This is a situation shown in FIG. 3. Naturally, care should be taken beforehand to control the solenoid valve 22 so as to benefit from hydraulic damping, thereby making it possible to control the return speed of the rod as released in this way under drive from the load, as explained above.

Furthermore, it is possible to take advantage of the locking device 6 to deliberately separate the rod 2 from the nut 7, in the absence of a failure. Under the action of a load, the rod 2 returns into the actuator, with its speed being controlled by the hydraulic damping implemented in this way. For example, by measuring the time taken by the rod to move from its extended position to its returned position, it is possible to verify that the hydraulic damping is operating properly. By way of example, this verification may be performed while in flight. It suffices, from time to time, to allow the landing gear to deploy solely under the action of gravity, after previously separating the screw 2 from the nut 7, and after placing the solenoid valve 22 in the fluid-passing state.

If the time taken by the rod to perform this movement lies outside a determined time interval, that is a sign of a malfunction in the hydraulic damping, and that maintenance action is therefore required.

Figure 3:
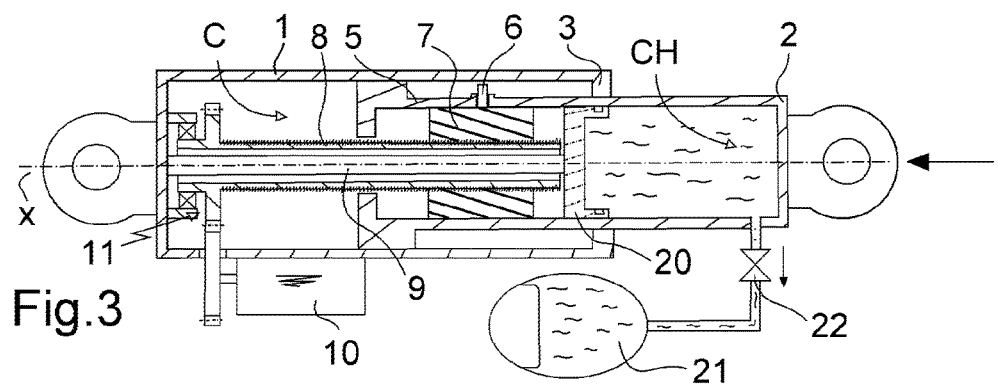
FIG. 3 is a view similar to the view of FIG. 2, while the rod is in the process of returning under drive from the load.
Figure 5:
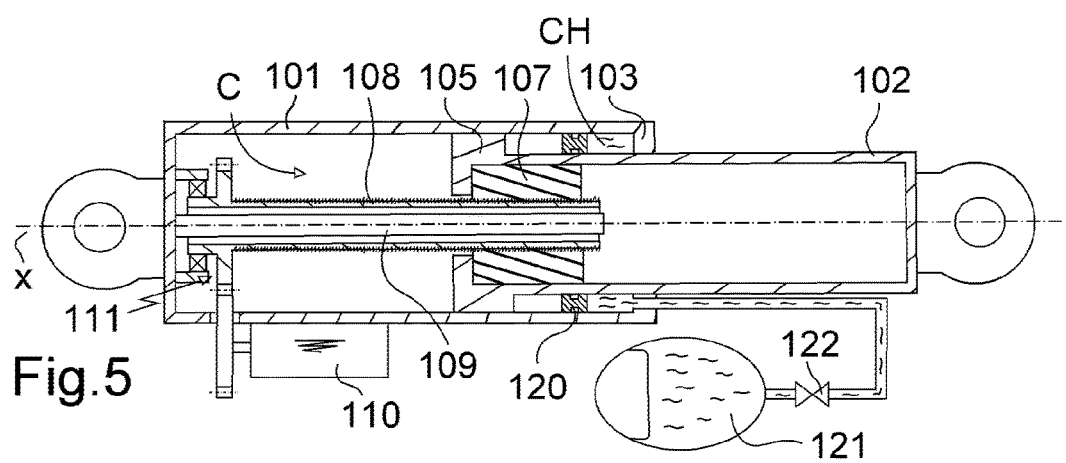
FIG. 5 is a longitudinal section view of an actuator in a second embodiment of the invention.

In a second particular embodiment as shown in FIG. 5, in which references for elements that are common with elements shown in FIGS. 1 to 3 have been increased by 100, the actuator still has a cylinder 101, and a sliding rod 102 with a nut 107 co-operating with a screw 108 driven by a motor 110. Furthermore, there can be seen the hydraulic chamber CH defined by a floating piston 120, the chamber being in communication with an accumulator 121 via a solenoid valve 122.

As can be seen, in this example the hydraulic chamber CH is arranged not in the end of the rod, but in the annular space between the cylinder 101 and the rod 102. For this purpose, the floating piston 120 is annular in shape and it is interposed between the cylinder 101 and the rod 102 in order to slide in sealing manner against both of these elements. An inner annular edge of the floating piston slides in sealing manner against a longitudinal outer annular wall of the rod 102, which it surrounds. An outer annular edge of the floating piston 120 slides in sealing manner against a longitudinal inner annular wall of the body 103. The operation of this actuator is entirely similar to the operation of the above-described actuator, except that the piston now comes into abutment against the bearing-forming portion 105 of the rod when the hydraulic chamber CH is full of fluid as a result of the solenoid valve being opened.

Thus, in both of the above-described embodiments, the floating piston 20, 120 is arranged to slide axially along the rod 2, 102, and between a first axial abutment carried by the rod 2, 102 and a second axial abutment 109 carried by the cylinder 103.

In the embodiment of FIGS. 1 to 3, the first axial abutment is formed by an inner axial end of the rod 2 and the second axial abutment 9 is formed by the axial abutment 9 secured to the cylinder 3 and passing through the screw 8.

In the second embodiment of FIG. 5 the first axial abutment is formed by an outer surface 105 of the rod 102 that forms an axial sliding bearing surface of the rod in and against an inner annular surface of the cylinder 103. In this embodiment, the second axial abutment is constituted by an inner annular surface of the cylinder in which the rod 102 slides.

The invention is naturally not limited to the above description, but on the contrary covers any variant coming within the ambit of the invention as defined by the claims. In particular, although rotary drive of the screw is provided herein by an electric motor (that may be directly engaged or that may act via gearing), the screw could be driven in rotation by any other means, such as a hydraulic motor, for example. Although the actuator shown has a rod that can be separated from the nut, this is merely an option. The actuator need not include a locking mechanism enabling the rod and the nut to be secured to each other or to be separated. Furthermore, in the event of mechanical actuation being blocked, it is possible to envisage other means for releasing the rod, such as releasing the screw, for example.

The invention claimed is:
1. An actuator comprising:
   a cylinder (1; 101),
   a rod (2; 102) mounted to slide in said cylinder,
   a screw (8; 108) extending inside the rod to co-operate with a nut (7; 107) secured to the rod, the screw being driven in rotation by a motor (10; 110), and
   a floating piston (20; 120) sliding in sealed manner against the rod inside of the actuator and defining with said rod a hydraulic chamber (CH) arranged inside the actuator, the hydraulic chamber being filled with hydraulic fluid and in fluid flow communication with an accumulator (21; 121) via a solenoid valve (22; 122) that is controllable between a closed state in which the chamber is isolated from the accumulator, and a fluid-passing state in which the hydraulic fluid can pass from the hydraulic chamber to the accumulator and inversely depending of difference of pressure between the hydraulic chamber and the accumulator,
   wherein a calibrated resistance is exerted against the passage of fluid from the chamber towards the accumulator as obtained when movement of the rod inside the actuator leads to a reduction in the volume of the hydraulic chamber, said calibrated resistance being provided to oppose the motion of the rod.

2. The actuator according to claim 1, wherein the floating piston is arranged to be capable of sliding along the rod and between a first axial abutment carried by the rod (2, 102) and a second axial abutment (109) carried by the cylinder (103).

3. The actuator according to claim 1, wherein the hydraulic chamber extends inside the rod, the floating piston (20) being mounted to slide in sealed manner inside the rod (2) and against said rod (2).

4. The actuator according to claim 1, wherein the hydraulic chamber extends between the rod (102) and the cylinder (101) of the actuator, the floating piston (120) being mounted to slide in sealed manner between the cylinder and the rod.

5. The actuator according to claim 1, including controllable locking means for holding the nut and the rod together and separating the rod (2) from the nut (7).

6. A method of using an actuator according to claim 5, wherein the solenoid valve is controlled to allow fluid to pass between the hydraulic chamber and the accumulator, the locking means are controlled to separate the rod and the nut, and then the rod is allowed to return into the cylinder under drive from a load coupled to the rod.

7. A method of using an actuator according to claim 1, wherein the solenoid valve is controlled to allow fluid to pass between the hydraulic chamber and the accumulator, and then the rod is allowed to return into the cylinder under drive from a load coupled to the rod.

8. A method of monitoring an actuator according to claim 1, wherein the rod is allowed to move freely under drive from a load coupled to the rod, and at least one operating parameter of a landing gear associated with hydraulic damping is verified.

9. The monitoring method according to claim 8, wherein the parameter is the time taken by the rod to move under the effect of the load.

10. The actuator according to claim 1, wherein the actuator is operative to drive a landing gear from a retracted to a deployed position so that the actuator retracts when the landing gear transitions from the retracted to the deployed position.

* * * * *